United States Patent [19]
Renz

[11] Patent Number: 5,606,861
[45] Date of Patent: Mar. 4, 1997

[54] CROSSFLOW CRYOGENIC FREEZER AND METHOD OF USE

[75] Inventor: Kent A. Renz, McHenry, Ill.

[73] Assignee: Air Liquide America Corporation, Houston, Tex.

[21] Appl. No.: 483,582

[22] Filed: Jun. 7, 1995

[51] Int. Cl.⁶ .......................... F25D 13/06; F25D 17/02
[52] U.S. Cl. .................. 62/63; 62/374; 62/380; 34/576
[58] Field of Search .................. 62/374, 380, 63; 34/304, 391, 359, 429, 576, 583

[56] References Cited

U.S. PATENT DOCUMENTS

| | | |
|---|---|---|
| 1,865,168 | 6/1932 | Buhr . |
| 2,527,542 | 10/1950 | Gilson ........................... 62/380 |
| 2,677,943 | 5/1954 | Nelson et al. . |
| 3,027,728 | 4/1962 | Greer et al. ................... 62/380 X |
| 3,553,973 | 1/1971 | Moran . |
| 3,605,434 | 9/1971 | Boese . |
| 3,708,995 | 1/1973 | Berg . |
| 3,813,895 | 6/1974 | Klee et al. . |
| 3,892,104 | 7/1975 | Klee et al. . |
| 3,952,540 | 4/1976 | Okada et al. . |
| 4,086,784 | 5/1978 | Wagner ........................... 62/374 |
| 4,157,018 | 6/1979 | Goltsos . |
| 4,475,351 | 10/1984 | Klee . |
| 4,481,782 | 11/1984 | Mukerjee . |
| 4,726,766 | 2/1988 | Stewart et al. . |
| 4,757,691 | 7/1988 | Compagnon . |
| 4,803,851 | 2/1989 | Stokes . |
| 4,912,943 | 4/1990 | Hubert et al. . |
| 5,343,714 | 9/1994 | Kiczek et al. . |
| 5,343,715 | 9/1994 | Lang . |
| 5,351,495 | 10/1994 | Lermuzeaux . |
| 5,444,985 | 8/1995 | Lang et al. .................... 62/374 X |
| 5,454,232 | 10/1995 | Lermuzeaux . |

FOREIGN PATENT DOCUMENTS

| | | |
|---|---|---|
| 0605147 | 7/1994 | European Pat. Off. . |
| 0667500 | 8/1995 | European Pat. Off. . |
| 0667501 | 8/1995 | European Pat. Off. . |
| 0667502 | 8/1995 | European Pat. Off. . |
| 0667503 | 8/1995 | European Pat. Off. . |
| 2134238 | 8/1994 | United Kingdom . |

OTHER PUBLICATIONS

Liquid Carbonic Corporation brochure.
Cryo Shield System, Equipment Specifications, Model JE–U3A Freezer Flight IQF System, Liquid Carbonic Corporation, 1981.
Ultra Freeze Tunnel Specification and United States Department of Agriculture Food Safety and Quality Service, Washington, D.C., letter dated Aug. 13, 1979.
Liquid Nitrogen Immersion Freezes CIF–300 Series, Koach Freezing Systems.
The New KwikFreeze tumbler: IQF food freezing just got a little easier, AIRCO.
Crust Flow—The IQF Freezing System, Liquid Air, No. 1071/72 A, Jan. 1992.

Primary Examiner—Christopher Kilner
Attorney, Agent, or Firm—Burns, Doane, Swecker & Mathis

[57] ABSTRACT

An individual quick freeze apparatus is presented which is designed to allow continuous production of high quality individually quick frozen product, for example food products, using a process which constantly alters the orientation and position of the product which is being frozen. The freezer includes an elongated freezing chamber having a product support extending from a product entrance end to a product exit end. In a preferred embodiment, a plurality of liquid cryogen injectors are provided which spray a cryogenic liquid directly on the product. At least one blower is positioned along at least one the side of the product support to blow cold recirculated gas across the product to cool and agitate the product. The direct liquid/gas contact with the product causes rapid heat removal allowing for more product throughput per length of freezer.

27 Claims, 5 Drawing Sheets

CROSSFLOW CRYOGENIC FREEZER AND METHOD OF USE

BACKGROUND OF THE INVENTION

1. Field of the Invention

The invention relates to a cryogenic freezer for individually quick freezing articles such as food products. More particularly, the invention relates to a freezer designed to produce high quality quick frozen food products by placing the food products on a conveyor and delivering liquid and gaseous cryogen directly to the product on the conveyor.

2. Description of the Related Art

Individually quick frozen (IQF) products refer to food products which are frozen individually prior to packaging, as opposed to products which are frozen in clumps or blocks. Examples of such IQF products include hamburger patties, fruits, vegetables, diced ham, chicken pieces and patties, shrimp and scallops. Products frozen by IQF freezing techniques offer distinct advantages over block freezing methods. In particular, products which are frozen in clumps or blocks must be completely defrosted before any of the product can be used due to the fact that it is all frozen together. In contrast, IQF products can be used in the amount desired and the unused portion can be returned to the freezer. Due to this advantage, IQF products effect a premium on the market over block frozen products.

Different types of apparatus are known to be used for IQF freezing including straight tunnel freezers, mechanical chilled fluidized bed freezers, liquid nitrogen immersion freezers, carbon dioxide flighted freezers, and carbon dioxide tumbling freezers.

A traditional means of cryogenic freezing is through the use of what is referred to as a straight tunnel freezer. This process uses a conveyor belt that runs through an enclosed freezer. The product travels on the belt through the freezer. As the product travels, it is sprayed directly with cryogen and is cryogenically frozen. Typical cryogens used are liquid $CO_2$ (–110° F., –79° C.) and liquid nitrogen (–320° F., –196° C.). The large difference in temperature between the product and the gaseous atmosphere in the freezer causes a quick heat exchange and results in fast freezing of the product. Because of this quick freeze, or cryogenic freeze, it is known that there is less cell damage in the product and thus less product damage. In the straight tunnel freezer, there are usually several top mounted fans blowing down on the product causing the thin layer of warm air surrounding the product to be removed and replaced with the colder cryogen gases. This results in a quick transfer of heat from the product. This process works well with products that are large, mostly dry, and can be placed on a single belt separated from each other so that they cannot freeze together. There are also so-called triple tier models, wherein food travels on three separate horizontal conveyer belts, the food on the top belt falling onto the middle belt, and then from the middle belt onto the bottom belt. Because the top-mounted fans cannot adequately move the gas past the food on the middle conveyer and especially the bottom conveyer, side-mounted fans are sometimes provided. However, these side-mounted fans are low power, simply to move the gas around, and are not intended to move the food on the conveyer belts or lift the food off of the belts.

One drawback for obtaining IQF quality with a straight tunnel freezer is that a small sized product will be blown off the belt by the fans and then will be lost in the freezer. Furthermore, there is also a problem with the product freezing to the belt, especially if the product is wet.

The mechanical chilled fluidized bed freezers employ a freon or ammonia cooling system for cooling the air within the freezer through which the food products pass on a conveyor. The food product is levitated by using fans or blowers which force mechanically refrigerated air upward through the conveyor belt. This creates a "fluidized" bed of cold air around the product which promotes heat transfer and thus individually quick freezes the product. Advantages of mechanical freezing are the low operating cost, high production rates, and efficiency due to recirculation of cold gases.

The main drawbacks of the mechanical fluidized bed freezer include the fact that product needs to be lightweight, of uniform shape, and small size for the true "fluidization" to occur. In addition, the complexity of the system usually requires special attention for installation and maintenance. Furthermore, frequent downtime is required to defrost the ice build-up on condensation coils inside the mechanical freezer. Other drawbacks include high capital investment, inflexibility of increased or decreased production requirements, and clumping if the product is not properly fed into the freezer.

A typical liquid nitrogen immersion is a relatively compact device which provides freezing quickly and in a short distance by direct immersion of food product in liquid nitrogen. With this freezer, the product travels on a belt in a downward inclined direction into a bath of liquid nitrogen where the partial fluidization and crusting of the product immediately take place. The product then travels in an upwardly inclined direction out of the liquid nitrogen. This is the fastest form of individual quick freezing available. If the product particles are not touching each other when freezing, the product will be individually quick frozen. In addition, products can be of varying sizes and shapes and little floor space is required for this freezer because of the low operating temperature. Efficiency of the system can be improved by adding a post-cool tunnel to extract heat from the unused nitrogen vapors. A post-cool tunnel is a straight tunnel that uses the cold vapors being exhausted by the immersion freezer and recirculates them around the product, further cooling the product.

There are several drawbacks with the liquid nitrogen immersion freezer. One drawback is that some products can crack from the drastic initial surface shrinkage of the product when immersed in liquid nitrogen. Also, due to the direct immersion into liquid nitrogen, it is very difficult to control the exit temperature of the product due to unpredictable volatility of liquid nitrogen. An additional drawback is that if the product particles are touching when immersed, they will be frozen together in clumps and not individually frozen. This freezing method does not use the chilling potential of the gas vapors and thus significantly decreases the efficiency. However, if a post-cool tunnel is used to increase the efficiency of the system, a substantial amount of additional floor space and capital cost are required.

A carbon dioxide flighted freezer typically provides a series of conveyor belts covered with a thin bed of $CO_2$ snow. At the entrance end of the flighted freezer, there is a crust freezing zone where the product is sprayed with liquid $CO_2$. The sprayed $CO_2$ also creates a bed of dry ice snow in which the product travels along through the freezer. This bed of dry ice sublimes to help further freeze the product. The freezer tunnel has a series of belts which run at upward inclines. These inclined belt segments successively drop the food onto the next lower belt segment, dropping and tumbling the product and $CO_2$ snow together through the freezer. The purpose of these successive drops is to break apart product that is frozen together. Unfortunately, this is not always successful and the impact created from the drop does not always successfully separate the product that has clumped together. The fans above the belt attempt to remove heat from the product and sublime the $CO_2$ before it exits the freezer.

Additional drawbacks of the $CO_2$ flighted freezer include the fact that $CO_2$ is the only expendable refrigerant that can be used with this process. Excess solid $CO_2$ snow on the belt that does not sublime before it exits the freezer may be packaged with the product. This packaged $CO_2$ can expand in the package causing the package to burst. Product breakage is also a common occurrence in this freezer due to the tumbling action of the product. Inefficiency and inconsistent product quality are additional drawbacks of the carbon dioxide flighted freezer. In addition, the amount of floor space and equipment required to produce large production in a flighted freezer can be a disadvantage when space constraints and equipment costs at a production facility are a consideration.

A known carbon dioxide tumbler includes a long rotating cylindrical drum set on an angle and fed by a conveyor belt which loads product directly into the rotating drum. Baffles inside the rotating drum lift and spill the product and direct the product towards the exit end of the freezer. Liquid $CO_2$ is also injected into the tumbler near the entrance and provides a tumbling bed of snow for the product to travel in. The disadvantages of this method are similar to the disadvantages of the $CO_2$ flighted freezer. Additionally, due to very little shearing action within the process, product may stick and accumulate on the inner surfaces of the drum. Furthermore, the cool $CO_2$ gas vapors are not used efficiently due to the lack of ventilated gas movement.

SUMMARY OF THE INVENTION

The present invention provides an improved cryogenic freezer which obviates many of the problems which occur with the known types of IQF freezers. The freezer according to the present invention produces a high quality quick frozen product with reduced product breakage and provides efficient use of the cryogenic liquid in embodiments wherein liquid cryogen is sprayed directly onto product. The quick-chilling capabilities of the high air velocity using blowers combined with product movement in which the products are constantly being agitated relative to anything which they can stick to while freezing produces a high quality IQF product.

A freezing apparatus according to one aspect of the invention includes an elongated freezing chamber defined by an upper surface, a lower surface and two side walls. The freezing chamber also includes a product entrance and a product exit. A product support, preferably a moving conveyer belt, is provided within the freezing chamber for transporting product through the freezing chamber from the product entrance to the product exit. In embodiments wherein liquid cryogen is sprayed directly onto the product, at least one liquid cryogen injector is positioned inside the freezing chamber. Preferably, a plurality of liquid cryogen injectors are positioned along at least one side of the product support to spray a cryogenic liquid across the surface of the product support and directly onto the product as the product is transported thereon. In addition, a plurality of blowers each having an inlet and an outlet direct cold recirculated gas across the product conveyor to cool and agitate the product.

The invention also relates to a food product freezing apparatus including an elongated freezing chamber including a product entrance and a product exit. A product conveyor belt within the freezing chamber transports product through the freezing chamber from the product entrance to the product exit. A plurality of blowers positioned on both sides of the conveyor belt each having an inlet and an outlet direct cold recirculated gas across the product conveyor to cool and agitate the product.

Another apparatus of the invention for individually quick freezing products comprises:

a wall structure defining an elongated freezing chamber also including a product entrance and a product exit;

a product support within the freezing chamber for supporting individual product pieces as they pass through the freezing chamber from the product entrance to the product exit;

at least one refrigeration coil positioned at least one location effective to create a temperature in the freezing chamber sufficiently low enough to individually freeze the product pieces as the product pieces pass through the freezing chamber; and at least one blower each having an inlet and an outlet, the outlet arranged for directing cooled air transversely across the product support to cool and agitate the individual product pieces, the air cooled via contact with the cooling coils. In a preferred apparatus in accordance with this embodiment, at least one liquid cryogen injector is positioned within the freezing chamber for directing a cryogenic liquid onto the product pieces.

The invention also relates to a method for individually quick freezing individual pieces of product, the method comprising the steps of:

delivering a product to a freezing chamber;

transporting the product through the freezing chamber;

spraying a cryogenic liquid directly on the product from at least one location in the chamber; and recirculating a cryogenic gas produced from vaporization of the cryogenic liquid through the freezing chamber with a plurality of blowers, the blowers applying a stream of cold gas to the product to further cool and to agitate the product. In one preferred method embodiment, the product is transported through the freezing chamber at least partially by being translated in two dimensions across a product support by the blowers positioned on both sides of the product support. In another preferred embodiment, the product is transported through the freezing chamber at least partially by being translated in three dimensions by the blowers being positioned on a lower portion of a pair of side walls, one of each side wall positioned on either side of a product support. Preferably, the side walls are curved. The blowers apply a stream of cold gas to the product to further cool and to agitate the product.

BRIEF DESCRIPTION OF THE DRAWINGS

The invention will be described in greater detail with reference to the accompanying drawing figures, in which like elements bear like reference numerals, and wherein.

The figures are not to scale and are merely illustrative of the invention.

DESCRIPTION OF PREFERRED EMBODIMENTS

The cryogenic individual quick freeze freezer apparatus 10 according to the present invention provides an apparatus which employs cryogenic liquid to efficiently crust freeze or fully freeze food products or other industrial products (such as rubber spheres and the like) of small to medium size (from about 1 millimeter diameter to about 5 centimeters in diameter for roughly spherical items, such as plums). The food or other industrial product is preferably of a size and shape such that it can be moved in two or three dimensions. For example, food products that may be IQF by the freezer apparatus of the invention include shrimp, peas, diced meat, and meatballs. Examples of products that probably would not be preferred include hamburger patties, packaged food, and, due to the fragility and dimension ratios, products like tortillas and potato chips.

Freezer apparatus 10 preferably uses direct contact of cold gases such as nitrogen, carbon dioxide, argon and the like, and mixtures of same, to cool the product as it travels through a freezing chamber 14 along a product support, preferably employing a moving conveyor belt 12. It should be understood, however, that a moving conveyor belt is not necessary in all embodiments; a stationary table can be used. This is because in some preferred embodiments a plurality of blowers 18 are positioned on either side of product support 12 to agitate the product, move the product across the product support, and to cool the product as it passes through freezing chamber 14 from a product entrance 40 to a product exit 42 in the direction of the arrows A.

Figure 1:
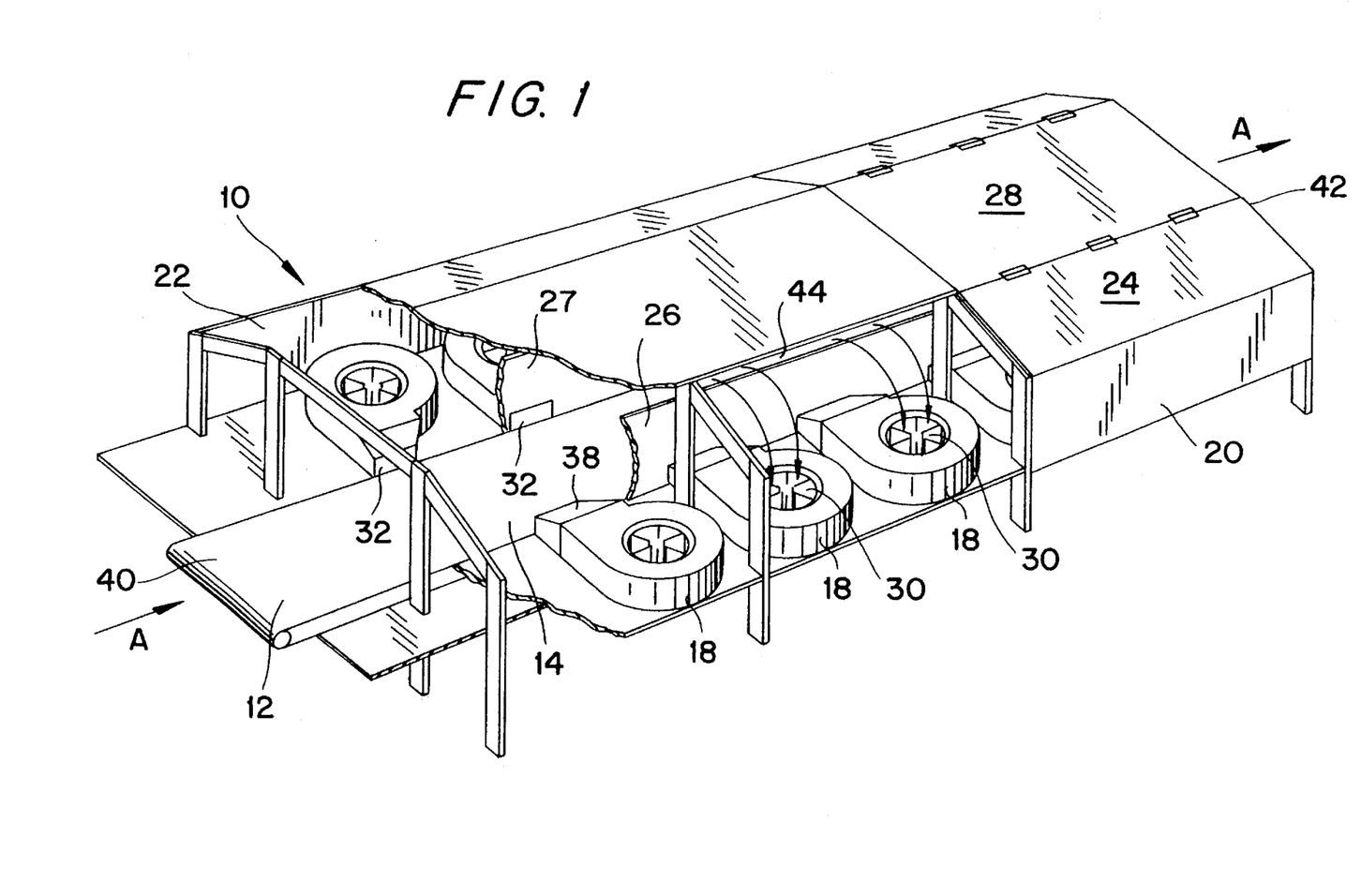
FIG. 1 is a perspective view, partly in section, of the freezer according to a preferred embodiment of the present invention.

As illustrated in FIG. 1, a preferred freezer apparatus 10 according to the present invention includes conveyor belt 12 which conveys the food product to be frozen through elongated freezing chamber 14. While in freezing chamber 14, the product is individually quick frozen, preferably by intimate contact with cryogenic liquid injected by one or more cryogen injectors 16 (which are illustrated most clearly in FIG. 5) and with cold recirculated gas from the vaporization of the cryogenic liquid which has been recirculated by blowers 18 positioned at the sides of the conveyor belt 12.

It should be emphasized that blowers 18 must be able to function to effect movement of the food or other product, either two-dimensionally across product support 12, or, more preferably, in three dimensions, such that each individual food or other product is literally supported only by the force of the blowers in freezing chamber 14. This is significantly different from the simple provision of fans of the prior art which are simply meant to move the gaseous cryogen around inside the freezing chamber.

A freezer housing 20 is provided which encloses freezing chamber 14 and the associated cooling devices. The freezer apparatus, and thus the freezer housing, must be of a length and shape to perform the desired freezing function, which may be crusting of each individual product, completely freezing each individual product, or somewhere in between crusting and completely freezing. Although somewhat subjective and hard to define, crusting is generally understood to mean that only a portion of the item being processed is frozen, that portion defined by the volume between the peripheral surface of the item and another imaginary surface located radially inward (for spherical products) a percentage of the radius of the product. This percentage typically and preferably ranges from about 0 to about 50 percent, although some in the art may refer to the product as being crust frozen if any portion of the product remains unfrozen, such as a small core portion.

Figure 2:
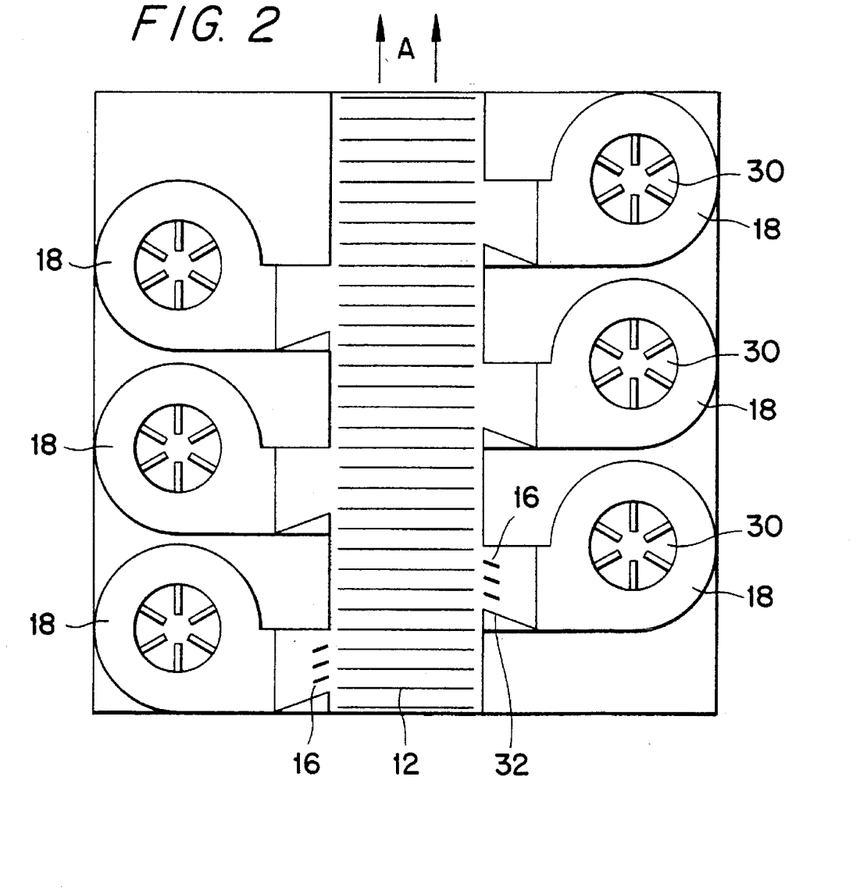
FIG. 2 is a schematic top view, of one modular section the freezer of FIG. 1.
Figure 4:
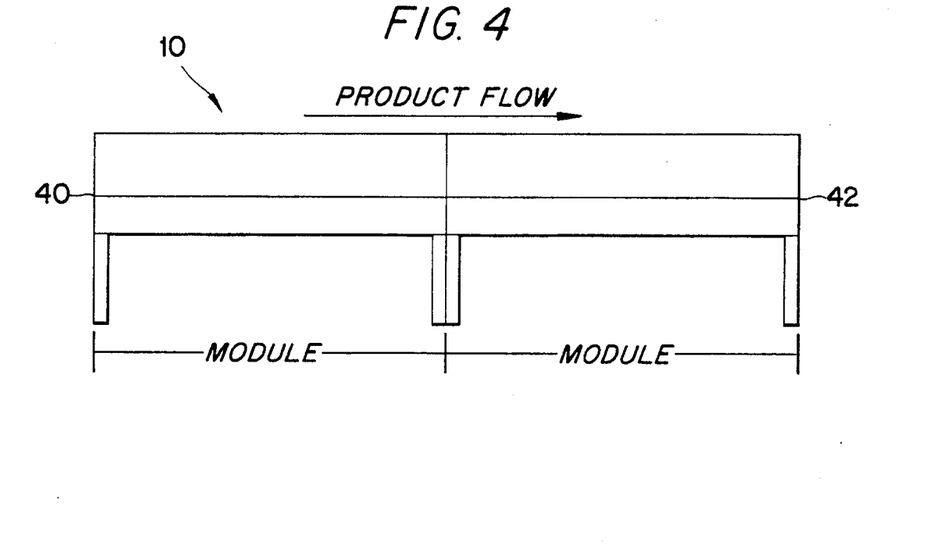
FIG. 4 is a schematic side view of two connected modular sections of the present invention.

Freezer housing 20 is preferably of a modular construction, as illustrated in FIGS. 1 and 4, which illustrate a modular freezer housing constructed of two freezer housing modules connected at their ends. Preferably, each freezer housing module of the modularly constructed freezer housing is of a length sufficient to contain a total of one to about ten blowers 18, preferably with an equal number of blowers located on each side of conveyor belt 12. Illustrated in FIG. 2 are six blowers 18 in each modular freezer housing 20, although the presently preferred configuration is 8 blowers 18, four on each side of freezer housing 20. Modular freezer housings 20 are adapted to be easily connected to one another to form a freezer apparatus 12 of any length necessary for a particular use. Freezer housing 20 includes freezing chamber 14 and two side recirculation chambers 22 positioned on either side of freezing chamber 14. Recirculation chambers 22, preferably containing a plurality of blowers 18, are preferably provided with hinged covers 24 which may be opened to provide access to the blowers to facilitate adjustment, maintenance and cleaning.

In preferred embodiments such as illustrated in FIG. 1 wherein cryogenic liquid is sprayed directly onto a freezing chamber, freezer housing 20 completely encloses and contains the cool cryogenic gas so that the only openings provided are product entrance 40 and product exit 42 at either end of freezer apparatus 10. Product entrance 40 and exit 42 are preferably provided with flexible flaps (not illustrated) which function both to contain the cryogenic gas and are flexible to allow the product to pass through. Alternatively, product entrance and exit openings may be provided which are appropriately size to allow the product to pass through while allowing minimal cryogenic gas to escape. In addition, freezer housing 20 is preferably entirely insulated to further improve the efficiency of freezer apparatus 10.

Conveyor belt 12, according to a preferred embodiment of the present invention, is a variable speed conveyor belt which extends through the entire length of freezing chamber 14 and is preferably made of a solid or tightly woven mesh material, for example nylon solid or mesh. The solid or tightly woven mesh material allows smaller particles of the product which may have broken off to be transported through the freezer on conveyor belt 12 along with the larger pieces. Therefore, waste which is common in known freezer systems due to smaller pieces of product falling through conveyor belt 12 and building up on the bottom of the freezer is prevented. The preferred orientation of any product support useful in the invention is horizontal; however, other orientations are also possible as illustrated in FIGS. 6–11. If the product support is a moving conveyor belt as illustrated in FIG. 1, the speed of conveyor belt 12 may be varied as necessary for a particular use and installation.

Figure 3:
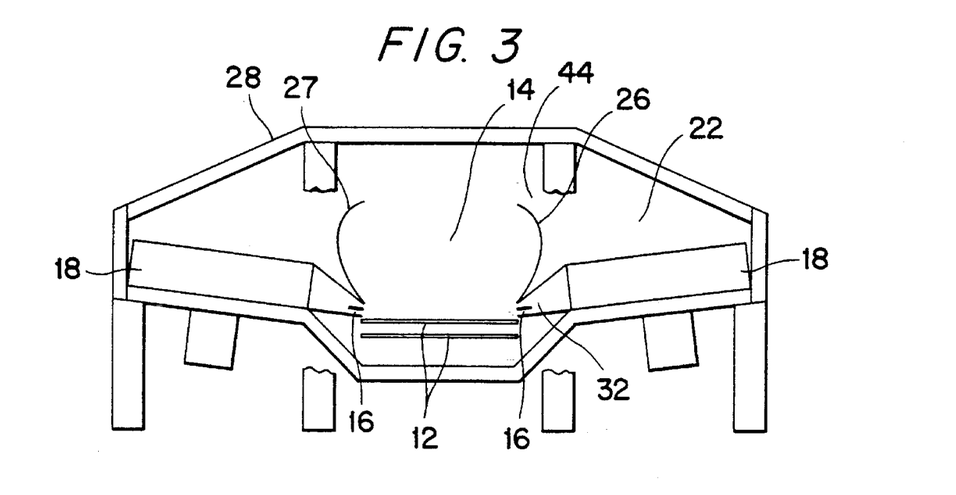
FIG. 3 is a schematic end view, of the interior of one modular section of the freezer of FIG. 1.

As illustrated most clearly in FIGS. 3 and 4, a pair of side walls 26 and 27 of freezing chamber 14 are each preferably convexly curved outward and have lower edges which abut or nearly abut the side edges of the conveyor belt 12 so that small pieces of product can not pass between conveyor belt 12 and side walls 26 and 27. Convexly curved side walls 26 and 27 allow the product which is translated in two or three dimensions by the force of blowers 18 to travel partially up curved walls 26 and 27, therefore, preventing the product breakage which can occur when product is caused to collide with a vertical wall surface, although vertical, concave, and irregularly shaped side walls may be employed. Further, one side wall may be vertical, while the other is convex or concave. When taken together, the two convexly curved side wall surfaces 26 and 27 form a semi-cylindrical surface with an opening along the top which extends the length of freezing chamber 14 above conveyor belt 12.

A gap 44 is provided between the top of the two curved side wall surfaces 26 and 27 and a top cover 28 of freezer housing 20, preferably along the entire length of freezing chamber 14 as illustrated in FIG. 3. Gap 44 allows recirculating cool cryogenic gas to pass from the freezing chamber 14 over side walls 26 and 27 and into recirculation chambers 22.

Blowers 18 mounted in recirculation chambers 22 each have an inlet 30 preferably on the upper surface thereof and an outlet 32 in one of side walls 26 or 27 of freezing chamber 14. Blowers 18 draw the cold gas from freezing chamber 14 through gap 44 between the top of side walls 26 and 27 and top cover 28 and recirculate the cold cryogenic gas across the product on conveyor belt 12. Blower outlets 32 direct the cryogenic liquid (or cold air in mechanical-type apparatus embodiments discussed below) laterally across conveyor belt 12 directly on the product, causing the product both to be cooled and to be agitated or blown across and/or over conveyer belt 12 at the same time by the force of the gas. In embodiments where cryogenic liquid is sprayed directly into freezing chamber 14, the liquid cryogen injectors are preferably positioned in the blower exits of the first blowers, as illustrated in FIG. 2. Blowers 18 may be single speed or variable speed, depending on factors such as product size and shape, whether two dimensional or three dimensional translation is desired, and the like.

Blowers 18 are preferably positioned on either side of conveyor belt 12 in an alternating arrangement in the conveyor direction, as illustrated most clearly in FIG. 2, so that each individual piece of the product is blown gently back and forth across conveyor belt 12 as well as up side walls 26 and 27 as they advance through freezing chamber 14. In this way clumping of individual frozen product pieces into a larger mass is prevented because each of the product pieces moves individually in a random path through freezing chamber 14. Blowers 18 are positioned such that the gas is directed substantially transversely across conveyor belt 12, preferably perpendicular to conveyor belt 12 movement direction if it is a moving conveyor belt. If the product support is stationary, blowers 18 are preferably positioned such that the gas is directed at an angle to urge the product down stream in the apparatus. Alternatively, product may be fed into freezer apparatus 10 at product entry 40 in a fashion such that first-in product is essentially pushed out of the apparatus by the in-flux of more product. In this latter arrangement, blowers 18 may be positioned so that the gas is blown substantially perpendicular to conveyor belt 12.

The bottom edges of each blower outlet 32 are preferably at the same height as, or flush with, the top of conveyor belt 12. This ensures that no piece of product will pass in front of a blower without being affected by the gaseous cryogen flow being produced by liquid cryogen sprayers (discussed below), or by air in embodiments where mechanical cooling is used. To further ensure that no product will pass unaffected by the air or gaseous cryogen movement, blowers 18 are preferably tilted down at an angle with the horizontal plane of conveyor belt 12. This angle preferably ranges from about 1° to about 20°, more preferably from about 5° to about 15°. This slight tilt to blowers 18 forces the gaseous cryogen and/or air at a downward incline toward conveyor belt 12 and also makes blowers 18 easier to clean by allowing moisture to drain out therefrom.

Although it is possible to use single speed motors in the blowers, it is more preferable to employ variable speed "squirrel cage" blowers. A variable speed blower having a 2 horsepower motor with a 13.5 inch (34.3 cm) radial blade rotating at 1725 rpm is sufficient to agitate a plurality of individual product pieces, each having an average diameter ranging from about 0.5 centimeter up to about 5 centimeters, and density ranging from about 0.7 to about 2.0 grams per cubic centimeter, across an 18 inch (45.7 cm) wide horizontal conveyor belt. Blowers of this and other sizes are available from Dayton Blower Co., Dayton, Ohio. However, a wide range of blower size to belt width ratios are also possible and are within the scope of the invention.

The size of blower outlets 32 may also be fixed or variable. Outlets 32 are preferably rectangular, however, they may be of any shape (for example geometric shapes such as square, triangle, semi-circle, and the like, and irregular shapes).

To direct both the gaseous cryogen and/or air and product flow toward product exit 42 of freezer 10, the design of blower outlets 32 preferably include a gas deflector 38 ("wedge") which slightly decreases the width of each blower outlet 32. In some preferred embodiments, including where it is desirable to increase the product dwell time in the freezer, gas deflectors 38 may be in various orientations. For example, the blower or blowers nearest product exit 42 may have a deflector that forces both gaseous cryogen and/or air and product flow toward product entrance 40 of freezer 10 to increase the product dwell time.

In embodiments wherein small product particles are blown up curved side walls 26 and 27 of freezing chamber 14, they could possibly pass into recirculation chambers 22. However, curved side walls 26 ad 27 are preferably constructed so that small product particles will be directed downward by the upper curved portion of side walls 26 and 27. In addition, small product particles may be partially suspended in the recirculating air flow. Therefore, freezing chamber 14 may optionally be provided with a divider or baffle (not illustrated) which extends along the entire length of freezing chamber 14. The divider, when used, would preferably extend from top cover 28 of freezing chamber 14 downward into freezing chamber 14 to block the passage of small product particles into recirculation chambers 22 and to improve the circulation of the gas and/or air.

Figure 5:
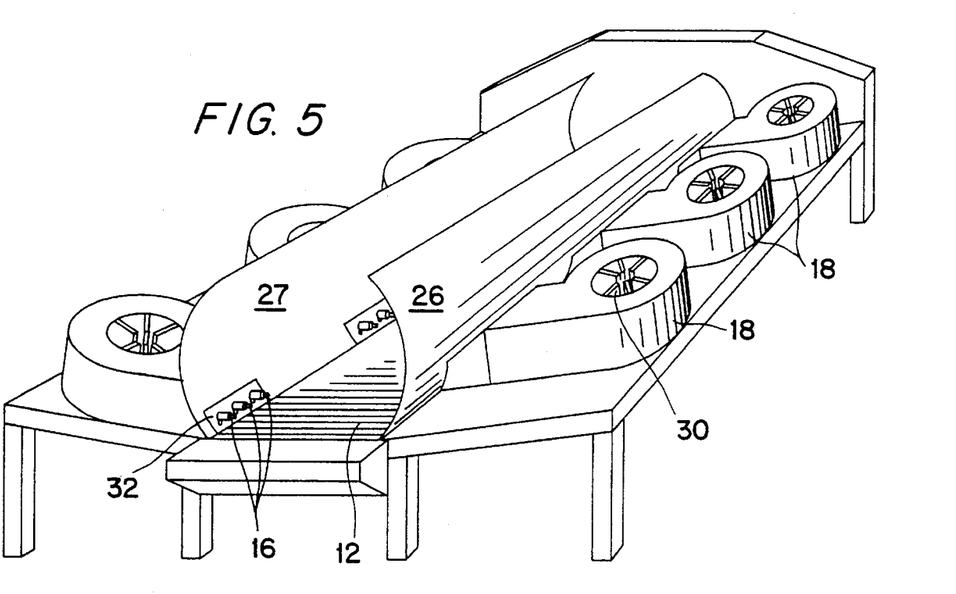
FIG. 5 is a schematic perspective view of the interior of a modular section.

As illustrated most clearly in FIG. 5, side walls 26 and 27 of freezing chamber 14 are provided with openings for blower outlets 32. In preferred embodiments, only blower outlets 32 near the product entrance (as depicted in FIG. 2) are provided with a liquid cryogen injectors 16. Liquid cryogen is supplied from a cryogenic liquid source (not illustrated) to a cryogen injection manifold which, in the embodiment illustrated, runs along the freezer underneath blowers 18. Alternative arrangements are suitable, such as where cryogen injection manifold is positioned along the top of freezer chamber 14. Each cryogen injector 16 is positioned within the lower portion of a blower outlet 32 in one preferred embodiment.

Liquid cryogen injectors 16 spray the cryogenic liquid directly on the food or other products which are passing along conveyor belt 12 in front of the blower outlets. Blower outlets 18 may be provided with a single cryogenic injector or a plurality of injectors, as illustrated in FIG. 5. Although groups of three injectors 16 are illustrated, the exact number of injectors grouped in one blower outlet will depend on the particular use of a freezer installation. Groups of between one and five injectors will be acceptable for most applications. In some embodiments, one or more liquid cryogen control valves (not illustrated) may be positioned upstream of the liquid cryogen injectors, the control valves operated through a temperature control system to control the volume of cryogenic liquid flowing through the injectors.

In addition, liquid cryogen injectors 16 are preferably provided at blower outlets 32 of more than one blower, although all injectors may be positioned in one blower. Particularly, liquid cryogen injectors are preferably provided in blower outlets at the product entrance 40 of the freezer and in the middle portion of the freezer but not at the product exit 42 of the freezer. Therefore, the cryogenic liquid provided by liquid cryogen injectors 16 which has vaporized after coming into contact with the product will be recirculated a number of times through blowers 18 to assist in cooling the product before the gas reaches the product exit 42 of the freezer.

Although the preferred cryogenic coolants are liquid nitrogen or liquid carbon dioxide, any expendable food service acceptable cryogen, such as argon, may be used, or mixtures of one or more cryogen. It is understood that if a non-food product is to be IQF, even bulk cryogens not acceptable to the food industry may be used. Furthermore, the liquid cryogenic injectors may be replaced with mechanical cooling methods, which may employ freon, ammonia, and the like, as the cooling media, which travels through cooling coils. Heat transfer in these embodiments [of course] occurs between the air in the freezer chamber and the refrigerant in the cooling coils. In these embodiments, blowers 18 preferably move air, although it is possible to also spray liquid cryogen into the freezer chamber at the same time that mechanical cooling is employed.

The blowers and liquid cryogen injectors together create a sufficiently high gas velocity (which may be computed from the blower CFM rating, blower outlet dimensions, product density and shape, and the like) to translate the product in two dimensions across the product support or three dimensionally in the freezer chamber. With variable speed blowers it is typically not necessary to make detailed gas velocity calculations—simple trial and error will enable one of ordinary skill to determine the optimum blower speed and thus the blower volume and gas velocity required for a particular product. The velocity of the gas is most preferably high enough to ensure that the contact which the product particles make with other particles and surfaces is brief enough so that they do not freeze together. The velocity of the gas can further enhance IQF by creating an air cushion between the product and any surface which the product may come into contact with. However, the gas velocity should not be so high that the product gets damaged due to excessive collisions.

Product exit 42 of the freezer functions to provide an exhaust for cryogen vapors out of the freezer.

In addition, the freezer apparatus of the invention are preferably provided with at least one and preferably more than one temperature sensor (not illustrated). The temperature sensors can be positioned along the length of freezing chamber 14 and connected to a temperature control system which adjusts the velocity of the liquid cryogen injected by liquid cryogen injectors 16 to control the temperature within the freezer. The temperature control system enables the user to adjust the temperature to a temperature ranging from ambient (about 25° C. to 35° C.) down to −320° F. (−196° C.) to obtain the optimal freezing temperature for a particular installation and use. A control system can also be provided which controls the conveyor belt velocity, blower motor speed and/or one or more liquid cryogen control valves to control the volume of liquid cryogen injected into the freezer apparatus.

Figure 6:
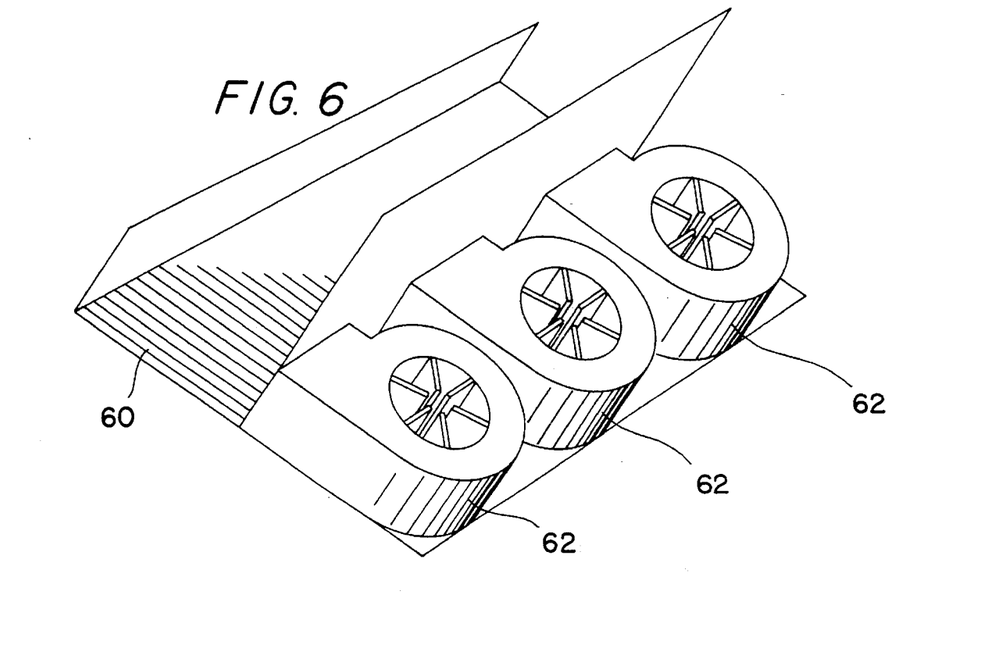
FIG. 6 is a schematic perspective view of a second embodiment of the present invention.
Figure 7:
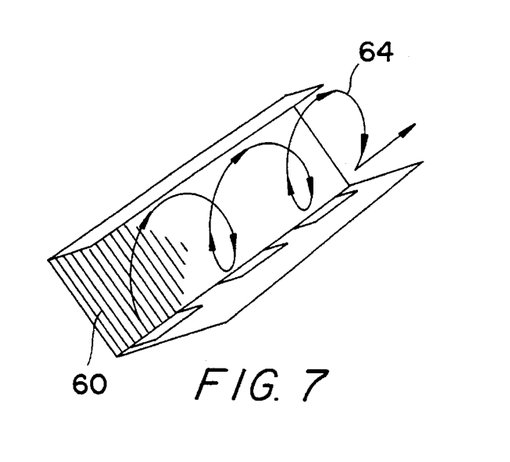
FIG. 7 is a schematic view of the path of a product in the embodiment illustrated in FIG. 6.
Figure 8:
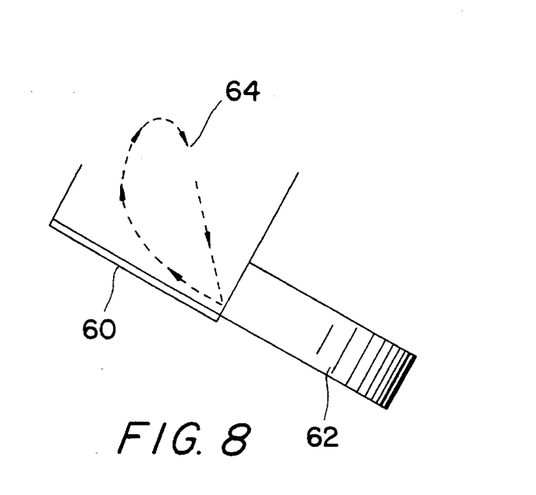
FIG. 8 is an end view of the embodiment illustrated in FIG. 6.

An alternative apparatus embodiment of the present invention is illustrated in FIGS. 6–8 in which conveyor belt 60 and blowers 62 are positioned at an inclined angle with respect to horizontal. In this embodiment, the path of the food product is illustrated by the line 64 in FIGS. 7 and 8. The product is moved by blowers 62 across conveyor belt 60 from right to left as illustrated in the figure and then the product falls back across conveyor belt 60 to the right towards the next blower. In this embodiment, it is necessary to provide blowers 62 only along one side of the conveyor belt since gravity moves the product back across the belt. In this embodiment, liquid cryogen injectors may also be provided along only one side, or on both sides, of the conveyor.

Figure 9:
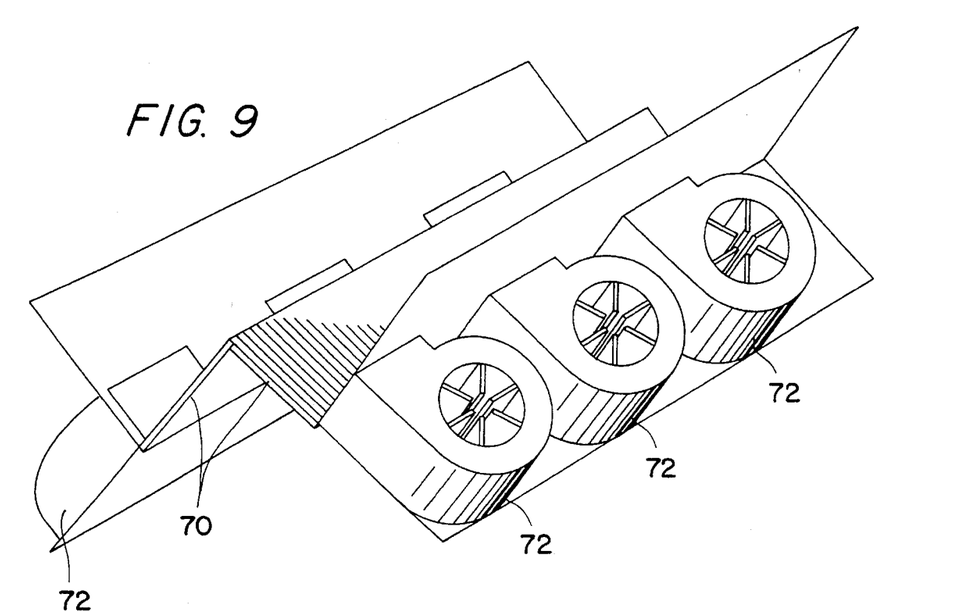
FIG. 9 is a schematic perspective view of a third embodiment of the invention.
Figure 10:
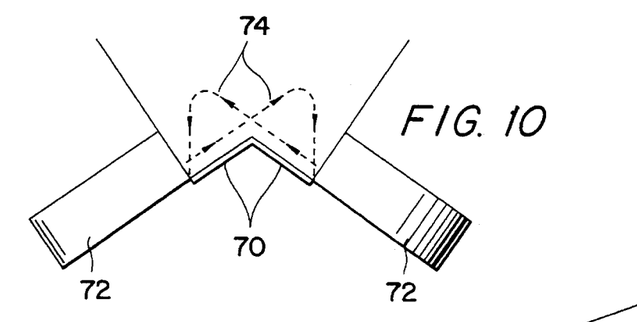
FIG. 10 is an end view of the embodiment illustrated in FIG. 9.
Figure 11:
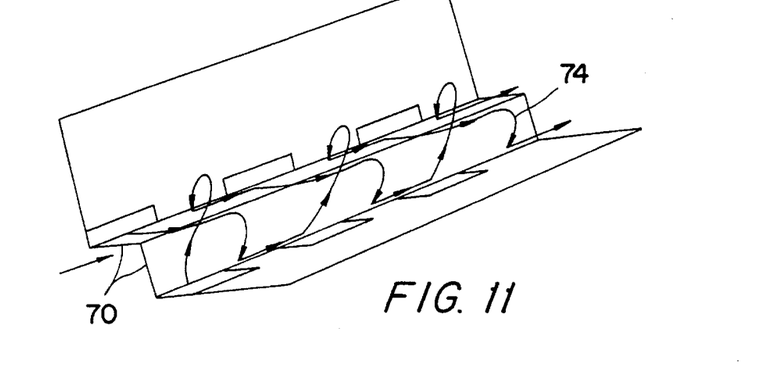
FIG. 11 is a schematic view of the path of a product in the embodiment illustrated in FIG. 9.

Another alternative apparatus embodiment of the invention is illustrated in FIGS. 9–11. In this embodiment a V-shaped conveyor belt 70 is provided having two inclined portions meeting at a crest. Blowers 72 of this embodiment are positioned on either side of conveyor belt 70, and blow the product back and forth over the crest of conveyor belt 70. In this embodiment, blowers 72 may be arranged either in an alternating or in an opposing arrangement. The path 74 of the product in this embodiment is illustrated in FIGS. 10 and 11.

In operation, each of the inventive apparatus embodiments described provides an unobstructed side gas flow from the blowers and injectors which bathes the complete surface of each piece of product in a cold environment, causing rapid heat exchange and resulting in a very time efficient means of freezing. Moreover, cold vapor is continuously recirculated through the freezing chamber by the blowers allowing for more efficient cryogen usage. The side mounted cryogen injection adds to the high velocity side to side air movement causing the product to be further agitated. The direct liquid/gas contact with the product causes the most rapid heat removal allowing for more product throughput per length of freezer. The resulting flash freezing leads to high quality IQF product. Product flow rates may range from about 500 pounds per hour up to about 4000 pounds per hour, but this is highly dependent on a combination of many factors, including the temperature of the product entering the freezer and the desired product exit temperature; the cryogen used; blower speed, and the like.

The invention will be further understood with reference to the following example.

EXAMPLE

A prototype freezer was built substantially in accordance with FIGS. 1–5 having a moving conveyor belt and six blowers, three blowers on each side. The main structural components (aside from the blowers, cryogen injectors and associated piping, and the like) were made from wood, although commercial units will be made of stainless steel (for the food industry). The blowers used were variable speed blowers, made by Dayton Co. model No. 7C639, although other equivalent blowers could have been used. The prototype allowed changing of the side wall shape during testing. Liquid nitrogen was used as the cryogen in all testing, which was injected in three injectors in the first blower on each side of the apparatus, as depicted in FIG. 2.

Four products were tested: diced smoked turkey, diced smoked ham, beef fajita strips, and shrimp, the latter having size such that forty shrimp =one pound. All of these food products had densities ranging from about 0.95 to about 1.05 grams/cm$^3$. The diced meat product pieces had an approximately square shape, with ⅜ inch square dimensions. The fajita strips had dimensions of about 0.25 inch ×1 inch ×4 inches. The flow rate of the food product through the freezer was about 1500 pounds per hour, and the products were IQF using food service acceptable liquid nitrogen sprayed into the freezer chamber from six injectors, one in each blower outlet. The side walls were both initially vertical for all foods, then switched to convexly curved walls, except for the shrimp, in which only convexly curved side walls were employed.

Each of the products was acceptably IQF in the apparatus, as evidenced by the hardness of the product coming out of the outlet of the freezer.

While the invention has been described in detail with reference to preferred embodiments thereof, it will be apparent to one skilled in the art that various changes can be made, and equivalents employed without departing from the scope of the appended claims.

What is claimed is:

1. An apparatus for individually quick freezing products comprising:

a wall structure defining an elongated freezing chamber including a product entrance and a product exit;

a product support within the freezing chamber for supporting individual product pieces as they pass through the freezing chamber from the product entrance to the product exit;

at least one liquid cryogen injector positioned at at least one location effective to create a temperature in the freezing chamber sufficiently low to individually freeze the product pieces as the product pieces pass through the freezing chamber; and at least one blower having an inlet and an outlet, the outlet arranged for directing vaporized cryogen transversely across the product support to cool, agitate, and transport the individual product pieces across the product support.

2. The apparatus of claim 1 comprising a plurality of blowers.

3. The apparatus of claim 2 comprising a plurality of liquid cryogen injectors, at least one liquid cryogen injector positioned at the outlet of a corresponding blower.

4. The apparatus of claim 2 wherein some of the blowers are positioned on a first side of the product support and some of the blowers are positioned on a second side of the product support, the blowers positioned in an alternating arrangement so that vaporized cryogen from alternating blowers contacts the individual product pieces and moves the pieces transversely in the freezing chamber.

5. An apparatus for individually quick freezing products comprising:

a wall structure defining an elongated freezing chamber including a product entrance and a product exit;

a product support within the freezing chamber for supporting individual product pieces as they pass through the freezing chamber from the product entrance to the product exit;

at least one liquid cryogen injector positioned at at least one location effective to create a temperature in the freezing chamber sufficiently low to individually freeze the product pieces as the product pieces pass through the freezing chamber; and at least one blower having an inlet and an outlet, the outlet arranged for directing vaporized cryogen transversely across the product support to cool and agitate the individual product pieces;

wherein the blowers are positioned on one side of the product support and the product support is positioned at an angle with respect to the horizontal so that the individual product pieces are moved across the product support by the blowers and return across the product support by the force of gravity.

6. The apparatus of claim 2 wherein the freezing chamber includes an upper opening allowing vaporized cryogen to flow to the inlets of the plurality of blowers such that the vaporized cryogen is recirculated through the upper opening to the inlets of the blowers and then through the blower outlets.

7. The apparatus of claim 1, wherein the freezing chamber includes a pair of opposing side walls, each side wall convexly curved outward from a lower section to an upper section of the side wall.

8. The apparatus of claim 1 further comprising a temperature sensor inside the freezing chamber and a temperature control means for controlling the volume of the cryogenic liquid exiting the liquid cryogen injectors based on a temperature sensed by the temperature sensor.

9. The apparatus of claim 1 wherein the product support is a conveyor belt.

10. The apparatus of claim 9 wherein the conveyor belt is formed of a non-porous material.

11. The apparatus of claim 9 wherein the conveyor belt is a variable speed conveyor belt.

12. An apparatus for individually quick freezing products comprising:

a wall structure defining an elongated freezing chamber including a product entrance and a product exit;

a product support within the freezing chamber for supporting individual product pieces as they pass through the freezing chamber from the product entrance to the product exit, wherein the product support is V-shaped;

at least one liquid cryogen injector positioned at at least one location effective to create a temperature in the freezing chamber sufficiently low to individually freeze the product pieces as the product pieces pass through the freezing chamber; and at least one blower having an inlet and an outlet, the outlet arranged for directing vaporized cryogen transversely across the product support to cool and agitate the individual product pieces.

13. The apparatus of claim 1 wherein the freezing chamber is constructed of a plurality of modular housing units each containing at least one blower, and wherein the modular housing units are configured to be attached to one another to form freezing chambers of varying lengths.

14. The apparatus of claim 13 wherein each of the modular housing units contains from four to ten blowers.

15. The apparatus of claim 1 wherein the blowers are provided with flow controllers which can be adjusted to create a desired degree of agitation of the individual product pieces.

16. The apparatus of claim 1 wherein a plurality of blowers are positioned along substantially the entire length of the freezing chamber for cooling and agitating the individual product pieces as they pass along the conveyor through the freezing chamber.

17. The apparatus of claim 1 wherein the blowers are arranged to create an unobstructed side gas flow which cools each piece of product.

18. The apparatus of claim 1 wherein the liquid cryogen injectors inject cryogenic liquid at a velocity and a distance such that the cryogenic liquid contacts the product before vaporizing.

19. An apparatus for individually quick freezing a product comprising:

a wall structure defining an elongated freezing chamber including a product entrance and a product exit;

a product conveyor belt within the freezing chamber for transporting product through the freezing chamber from the product entrance to the product exit; and a plurality of blowers each having an inlet and an outlet, the outlets of the blowers directing cold gas transversely across the product conveyor belt to cool, agitate, and transport the product in two dimensions, said plurality of blowers positioned on both sides of the conveyor belt.

20. The apparatus of claim 19 wherein the blowers are positioned in an alternating arrangement to blow the product back and forth across the conveyor belt.

21. The apparatus of claim 20 wherein the freezing chamber is provided with a pair of opposing side walls which are convexly curved outward and wherein the blowers blow the product partially up the side walls.

22. Method for individually quick freezing individual pieces of product, the method comprising the steps of:

delivering a product to a freezing chamber;

transporting the product through the freezing chamber;

spraying a cryogenic liquid directly on the product from at least one location in the chamber; and recirculating a cryogenic gas produced from vaporization of the cryogenic liquid through the freezing chamber with a plurality of blowers, said blowers applying a stream of cold gas to the product to further cool and to agitate the product and to transport the product in two dimensions.

23. A method for individually quick freezing individual pieces of product, the method comprising the steps of:

delivering a product to a freezing chamber;

transporting the product through the freezing chamber;

spraying a cryogenic liquid directly on the product from at least one location in the chamber; and recirculating a cryogenic gas produced from vaporization of the cryogenic liquid through the freezing chamber with a plurality of blowers, said blowers applying a stream of cold gas to the product to further cool and to agitate the product;

wherein the product is transported through the freezing chamber at least partially by being translated in two dimensions across a product support by the blowers positioned on both sides of the product support.

24. The method of claim 22 wherein the product is transported through the freezing chamber at least partially by being translated in three dimensions by the blowers being positioned on a lower portion of a pair of side walls, one of each side wall positioned on either side of a product support.

25. The method of claim 24 wherein the side walls are curved side walls.

26. An apparatus for individually quick freezing products comprising:

a wall structure defining an elongated freezing chamber also including a product entrance and a product exit;

a product support within the freezing chamber for supporting individual product pieces as they pass through the freezing chamber from the product entrance to the product exit;

at least one refrigeration coil positioned at at least one location effective to create a temperature in the freezing chamber sufficiently low to individually freeze the product pieces as the product pieces pass through the freezing chamber; and at least one blower having an inlet and an outlet, the outlet arranged for directing cooled air transversely across the product support to cool, agitate, and transport the individual product pieces across the product support, the air cooled via contact with the cooling coils.

27. Apparatus in accordance with claim 26 which further includes at least one liquid cryogen injector.

* * * * *